Figures 1, 2:
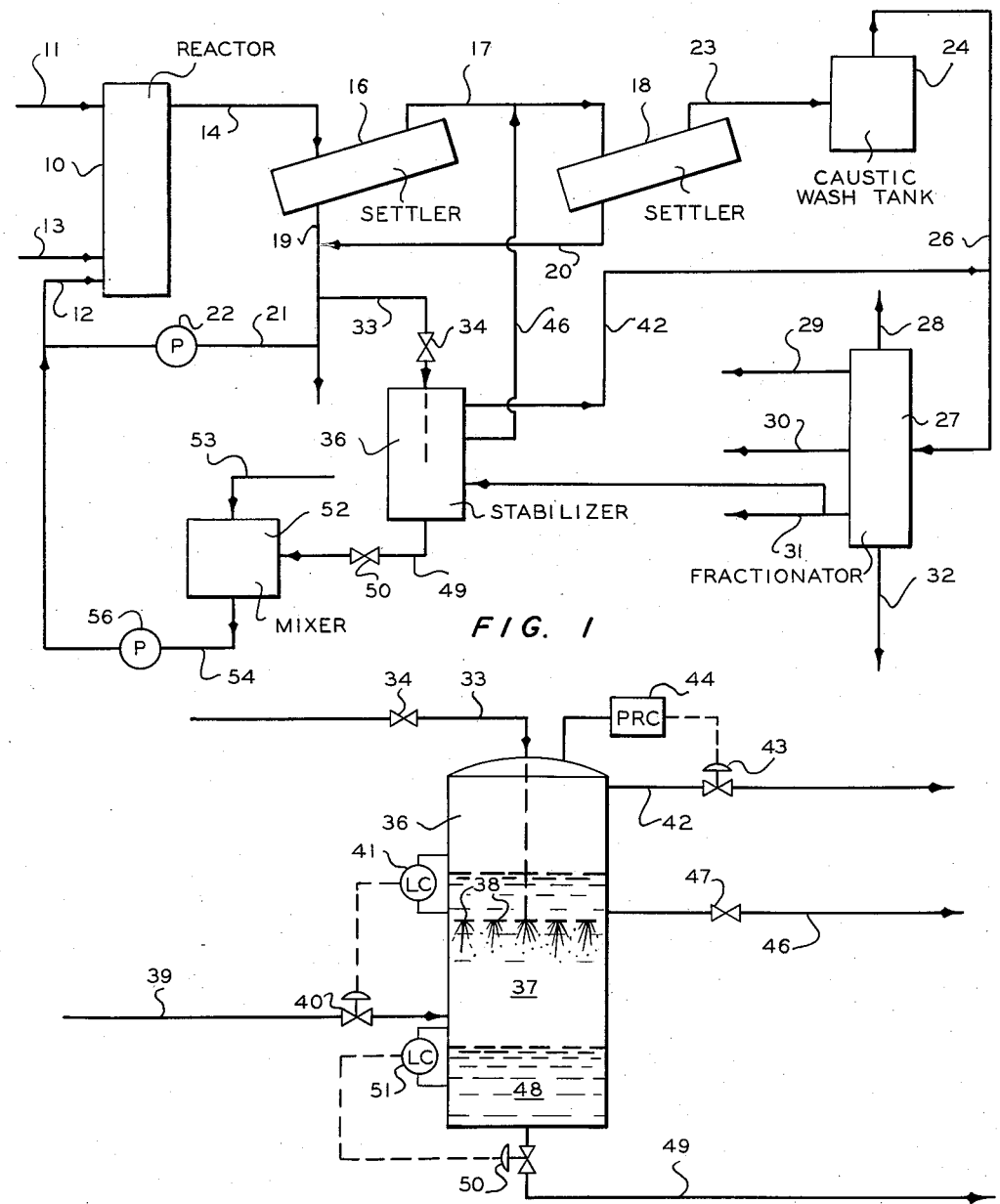

INVENTORS
THOMAS HUTSON, JR.
K.E. WALKER
BY
ATTORNEYS

United States Patent Office 2,982,801
Patented May 2, 1961

2,982,801

STABILIZATION OF HYDROCARBON-ALUMINUM HALIDE CATALYST

Thomas Hutson, Jr., and Kenneth E. Walker, Bartlesville, Okla., assignors to Phillips Petroleum Company, a corporation of Delaware Filed Jan. 26, 1959, Ser. No. 789,081

5 Claims. (Cl. 260—683.57)

This invention relates to the stabilization of hydrocarbon-aluminum halide catalyst. In another aspect it relates to an improved method of stabilizing and fortifying a liquid hydrocarbon-aluminum halide complex with fresh aluminum halide. In still other aspects it relates to a method and apparatus for removing volatile components from such a catalyst without foaming where the catalyst has been used in the conversion of hydrocarbons at elevated pressure.

Aluminum halide catalysts have been used in numerous processes for the conversion of hydrocarbons, including decomposition or cracking of high boiling hydrocarbons, isomerization of low boiling hydrocarbons and alkylation of alkylatable hydrocarbons, including isoparaffins, normal paraffins, cyclo-paraffins and aromatic hydrocarbons. In one of its more useful forms aluminum halide is in a liquid complex with paraffinic hydrocarbons which generally are normally liquid paraffin hydrocarbons, more or less highly branched, and boiling in the ranges of those fractions generally identified as kerosene and gasoline. During the progression of such hydrocarbon conversions the catalyst complex declines in acttivity and refortification by the addition of fresh aluminum halide is necessary either periodically or on a continuous basis. When the liquid catalyst complex is employed in conversion reactions at elevated pressure, highly volatile components are frequently dissolved or dispersed in the catalyst as it is removed from the reaction zone. The addition of fresh aluminum halide is most conveniently done at atmospheric pressure. It has been customery, therefore, to pass a portion of the liquid catalyst complex into a large vessel at atmospheric pressure wherein the catalyst is permitted to weather with considerable foaming until the light components have been removed, after which the fresh aluminum halide can be incorporated. Besides the foaming problem which attends this process it is normally time-consuming and requires relatively large pieces of equipment.

We have discovered a highly satisfactory method of fortifying a hydrocarbon-aluminum halide catalyst without a foaming problem by first stabilizing the complex through the removal of relatively high vapor pressure components, replacing these components with hydrocarbons having a relatively lower vapor pressure and thereafter adding the fresh aluminum halide to the complex at a reduced pressure, generally about atmospheric. The method of stabilizing the hydrocarbon-aluminum halide catalyst which we have developed comprises dispersing the catalyst in a body of liquid paraffin hydrocarbon thereby replacing the more volatile hydrocarbon components in said catalyst with the less volatile liquid paraffin hydrocarbons, separating the catalyst thus stabilized in a phase below said body of liquid paraffin hydrocarbon, separating the highly volatile hydrocarbons in a gas phase above the liquid paraffin hydrocarbon and withdrawing the stabilized catalyst and gaseous hydrocarbon as separate streams. Our invention also embraces in another aspect apparatus which is highly suitable for conducting the above-described stabilization process. This apparatus comprises a vertically elongated confined vessel containing means for introducing catalyst complex in a spray dispersion centrally within the vessel below the normal liquid level of the paraffin hydrocarbon wash liquid, means for continuously introducing fresh paraffin hydrocarbon wash liquid to maintain a relatively constant upper liquid level, means for continuously withdrawing from the lower portion of said vessel stabilized catalyst complex to maintain a relatively constant level of interface between the paraffin hydrocarbon wash liquid and the catalyst complex, and means for withdrawing from the upper portion of said vessel released gaseous components to maintain a relatively constant pressure within said vessel.

It is an object of our invention to provide a method of stabilizing a hydrocarbon-aluminum halide catalyst. Another object is to provide a method of fortifying a stream of such a catalyst by first removing highly volatile materials and thereafter incorporating fresh aluminum halide into the catalyst at substantially atmospheric pressure. Another object is to provide a method of stabilizing and fortifying such a catalyst in such a manner that the foaming problem is virtually eliminated. Still another object of our invention is to provide a method and apparatus for removing highly volatile materials from liquid hydrocarbon-aluminum halide catalyst with a minimum of foaming. Other objects, advantages and features of our invention will be apparent to those skilled in the art from the following discussion and drawings in which:

Figure 1 is a schematic flow diagram of an alkylation process showing the stabilization and fortification of recirculated catalyst; and Figure 2 depicts the stabilization process and apparatus of our invention.

It will be apparent from the following discussion that our invention can be profitably applied to stabilize and refortify hydrocarbon-aluminum halide catalyst which is employed in any hydrocarbon conversion process wherein there is a likelihood of light or highly volatile components collecting in the catalyst phase, either dissolved therein or dispersed as an amulsion. Our invention is especially suitable for application in an alkylation process as, for example, the alkylation of an isoparaffin with an olefin, particularly the alkylation of isobutane with ethylene to form diisopropyl. In such a process a substantial excess of isobutane is desirable to further the alkylation reaction and as a result the catalyst phase which is separated from the reactor effluent contains an appreciable amount of light components including butanes and some unreacted ethylene together with a small amount of isopentane. Since it is most convenient to refortify this catalyst by the addition of aluminum halide at atmospheric pressure, the presence of such light components presents a troublesome problem in this alkylation process.

To more fully describe our invention reference is now made to the drawing in which Figure 1 shows a typical alkylation operation and the manner in which our invention can be applied thereto. The alkylation takes place in reactor 10 by contacting the hydrocarbon feed entering through line 11 with hydrocarbon-aluminum halide complex catalyst which is recirculated continuously and enters reactor 10 through line 12. The hydrocarbon feed in this example is a mixture of isobutane and ethylene containing also a small amount of propylene and paraffin hydrocarbons, such as ethane and normal butane. Generally, about 4 or 5 volumes of isobutane to 1 volume of ethylene is introduced to the reactor in the fresh feed.

Aluminum chloride is the halide which is generally used in such alkylation processes, but it is not outside the concept of our invention to use other aluminum halides, particularly aluminum bromide. Aluminum fluoride generally does not give satisfactory results in alkylation reactions but mixed halides such as $AlCl_2F$ and $AlBr_2F$ and the like can be used.

Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 40 to about 70 percent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosene. An essential requirement for the preparation of a good catalyst appears to be the use of a sufficiently powerful mixing to maintain the aluminum halide and the hydrocarbon in intimate contact during the period the catalyst is being prepared.

Referring again to the alkylation of Figure 1, a hydrogen halide, for example hydrogen chloride, activator can be introduced to the reactor through line 13 to promote the reaction. Reactor 10 is provided with means to remove the heat of reaction and provide a highly efficient contacting between the hydrocarbon reactants and the liquid catalyst. Such means are conventional and are not shown in Figure 1 for the sake of simplicity. In this flow diagram other valves, pumps and compressors have been omitted where their use is conventional and does not affect the novelty of our invention.

The reactor effluent in line 14 contains a mixture of alkylated hydrocarbon, unreacted materials and liquid catalyst. This effluent is passed to a settling vessel 16 wherein a heavier liquid catalyst is permitted to settle and separate from the hydrocarbon. The hydrocarbon is withdrawn from the upper phase in settler 16 through line 17 and passed to a secondary settler 18 where further separation of alkylate and catalyst complex takes place. The liquid catalyst is withdrawn from the lower portions of settlers 16 and 18 through lines 19 and 20, respectively. This catalyst is recirculated through line 21 by pump 22, returning to the reactor 10 through line 12. The hydrocarbon product is withdrawn from settler 18 through line 23 and is passed through a caustic wash 24 and thence through line 26 to fractionation zone 27.

It should be understood that fractionation zone 27 may comprise a number of fractionating columns in which various separations are made. Normally, the hydrocarbon product is separated by fractionation to remove propane and lighter materials as an overhead stream in line 28 and butanes in line 29. This butane stream can be further fractionated to separate the normal butane from the isobutane which is recycled to reactor 10. Normal butane can be passed to an isomerization process which usually precedes the alkylation shown in this figure. Light alkylate having about 5 to 6 carbon atoms per molecule, predominantly diisopropyl, is withdrawn through line 30 and passed to aviation fuel blending. Heavy alkylate containing 7 or more carbon atoms per molecule and having an end boiling point of less than about 400° F. is withdrawn through line 31 and passed to motor fuel blending. Negligible or relatively small amounts of materials boiling above 400° F. may be formed and are withdrawn as bottoms through line 32.

As the reaction proceeds catalyst activity tends to decline unless steps are taken to refortify the catalyst by the addition of fresh aluminum chloride. According to our invention this refortification is conveniently carried out by withdrawing a small amount of the catalyst from line 21 through line 33. Withdrawing about 2 to 5 volume percent of the recirculating catalyst is normally sufficient for refortification. This portion of the liquid catalyst is passed through valve 34 in line 33 and thence into stabilizer 36. The pressure on the catalyst is reduced considerably and the catalyst is dispersed in a body of liquid hydrocarbon in stabilizer 36. The manner in which the liquid catalyst is stabilized by the removal of light components is now described in reference to Figure 2.

When the hydrocarbon-aluminum chloride catalyst enters the stabilizing tank 36 it is dispersed below the liquid level of paraffin hydrocarbon 37 through a plurality of spray nozzles 38. The wash liquid 37 is maintained in a relatively large body so that intimate contact between the entering catalyst and the hydrocarbon wash liquid is effected by the agitation provided by the sprays. This hydrocarbon wash liquid is preferably paraffin hydrocarbon having at least 6 carbon atoms per molecule and more preferably at least 7 carbon atoms per molecule with an end boiling not higher than 400° F. Most suitable in this particular operation is the heavy alkylate previously described. This liquid hydrocarbon is fed into vessel 36 through line 39. The liquid hydrocarbon of the wash liquid replaces the lighter hydrocarbons carried in the catalyst and releases these light hydrocarbons without foaming.

The flow of the wash hydrocarbon is controlled by motor valve 40 regulated by a signal from liquid level controller 41 which is sensitive to the liquid level of the liquid paraffin hydrocarbon in the upper portion of vessel 36. An upper liquid level is thereby maintained automatically by regulating the flow of wash hydrocarbon entering vessel 36 through line 39. The pressure in vessel 36 is substantially less than that employed in the alkylation reactor and can vary anywhere from atmospheric pressure to 50 p.s.i.g. The temperature is ordinarily in the range of about 125 to 175° F. The removal of light components can most satisfactorily be effected by operating vessel 36 at about 0–25 p.s.i.g. and thereby obtaining almost complete removal of butanes and lighter materials as well as a substantial amount of pentanes present in the incoming catalyst. It is preferred to operate vessel 36 as near to atmospheric pressure as practicable. When operating at the lower pressures most of the light components removed from catalyst collect in the gas phase of tank 36 and pass out through line 42. Motor valve 43 in line 42 is operatively connected to pressure recorder controller 44 which senses the pressure in tank 36 and controls valve 43 to maintain a substantially constant pressure in the stabilizer.

While we prefer to control the pressure in vessel 36 by controlling the flow of vapors through line 42, it is also possible to keep the pressure from building up by removing wash liquid through line 46. For example, a stream of the wash liquid can be recirculated through line 46 to the alkylation separation system. As shown in Figure 1, line 46 should reenter upstream from the caustic wash and preferably upstream from settler 18, joining the stream in line 17, since the recirculated wash will contain some catalyst phase in suspension. The amount of wash recirculation necessary can readily be determined by observing the catalyst at atmospheric pressure. If the concentration of light components in the wash liquid becomes too high, the removal of these light hydrocarbons from the catalyst is incomplete and the catalyst will foam at atmospheric pressure. The rate of wash liquid recirculation can be adjusted by valve 47 in line 46 until foaming of the catalyst leaving the stabilizer is not apparent. Removal of wash liquid can be controlled by vessel pressure. Withdrawal of vapors, however, permits a much lower volume of wash liquid to be used.

The stabilized catalyst separates from the wash liquid by gravity and accumulates as a separate phase 48 in the bottom of tank 36. Catalyst is withdrawn from tank 36 through line 49. The rate of catalyst withdrawal is regulated by motor valve 50 controlled by level controller 51 which is sensitive to the level of the catalyst-wash liquid interface. The specific gravity of the catalyst is considerably higher than that of the wash liquid and the interface can be readily sensed and maintained at a substantially constant level with the arrangement shown.

Referring again to Figure 1, overhead gases which leave tank 36 in conduit 42 are passed to fractionation zone 27, joining the main alkylate stream in line 26. Stabilized catalyst in line 49 is passed to mixer 52 which is maintained at about atmospheric pressure. Fresh aluminum chloride 53 is added to the mixer in an amount sufficient to refortify the total catalyst stream. Vigorous agitation in mixer 52 disperses the fresh halide in the stabilized hydrocarbon-aluminum chloride catalyst which is then passed through line 54 by pump 56 back to the main catalyst stream in lines 21—12. The refortification can thus be quickly and conveniently carried out at atmospheric pressure with no foaming problem.

An important feature of one aspect of our invention is the use of a relatively large body of paraffin hydrocarbon into which the catalyst complex can be sprayed. We have found that stable catalyst at atmospheric pressure can be formed by this method which uses very little alkylate as wash liquid yet maintains a high ratio of wash liquid to catalyst at the zone of dispersion. Normally, the only fresh alkylate that is added to the stabilizer is that needed to replace alkylate withdrawn in the catalyst phase and in the gas phase. As explained above, an additional amount of liquid alkylate may have to be withdrawn and recirculated, depending upon the pressure and temperature of operation. The volume of the body of wash liquid should be great enough to permit thorough agitation at the sprays with a quiescent zone at the catalyst-paraffin interface. A vertically elongated stabilization zone is preferred so that more opportunity for contact and separation is offered for a given quantity of wash liquid.

To further illustrate our invention the following examples are presented. The specific conditions are typical only and should not be interpreted as limiting our invention unduly.

Example I

Isobutane and ethylene in a 4 to 1 mol ratio are alkylated with vigorous agitation in the presence of a hydrocarbon-aluminum chloride complex catalyst at 130° F. and 400 p.s.i.g. The hydrocarbon to catalyst volume ratio is 8 to 1. The catalyst contains 55 weight percent aluminum chloride and 45 weight percent complexed hydrocarbon.

Catalyst and hydrocarbon are withdrawn and separated in two stages and the catalyst is recirculated to the reactor. About 4 volume percent of the recirculating stream of catalyst is drawn off for fortification. This catalyst stream contains about 25 volume percent dissolved and dispersed hydrocarbon, about 20 percent being $C_6$ and heavier and 5 percent being $C_5$ and lighter.

The catalyst to be refortified is sprayed into a body of heavy alkylate (gasoline boiling range of $C_7$ and heavier) below the liquid level thereof at 10 p.s.i.g. The $C_5$ and lighter components are released from the catalyst, being replaced with heavy alkylate. Further separation between the catalyst and alkylate takes place as the catalyst gravitates toward the bottom of the body of alkylate and a separate catalyst phase is collected below the alkylate. This catalyst contains 20 volume percent non-complexed hydrocarbon, essentially none of which is lighter than hexane.

The stabilized catalyst is passed to a mixer at atmospheric pressure where it is refortified with 0.3 pound of fresh $AlCl_3$ per gallon of complex. The fortified catalyst is returned to the reactor.

In both pressure reduction steps essentially no foaming of the catalyst is encountered.

Example II

Aluminum chloride-hydrocarbon catalyst used for diisopropyl alkylation and containing sufficient high vapor pressure components to cause considerable foaming of the catalyst at atmospheric pressure was sprayed into a 12 to 18 inch column of heptane in a 6 inch by 48 inch glass pipe. The temperature and pressure of the catalyst to the nozzle was 172° F. and 80 p.s.i.g. The pressure in the glass pipe was about atmospheric. A separate catalyst phase collected in the bottom 4 to 6 inches of the column. Catalyst was sprayed at a rate of 7.1 gallons per hour and stable complex was withdrawn from the bottom of the chamber.

Example III

The run of Example II was repeated with catalyst supplied to the nozzle at 125–134° F. and a pressure of 100–110 p.s.i.g. The spray rate was 5.6 g.p.h. Stable complex at atmospheric pressure was obtained.

As will be evident to those skilled in the art, various modifications of this invention can be made, or followed, in the light of the foregoing disclosure and discussion, without departing from the spirit or scope thereof.

We claim:

1. In a process for converting hydrocarbon in the presence of liquid hydrocarbon-aluminum halide catalyst at elevated pressure in a reaction zone wherein catalyst containing high vapor pressure components is separated from reaction zone effluent and recirculated to said zone, the improved method of fortifying said catalyst with fresh aluminum halide which comprises dispersing at least a portion of said catalyst being recirculated into a normally liquid hydrocarbon having relatively low vapor pressure thereby effecting replacement of high vapor pressure components in said catalyst with low vapor pressure hydrocarbon, passing the thus contacted catalyst to a refortification zone at a low pressure, incorporating aluminum halide in said catalyst, and returning the thus fortified catalyst to said reaction zone.

2. In a process wherein hydrocarbon is converted by intimate contacting with liquid hydrocarbon-aluminum halide complex catalyst in a reaction zone at elevated pressure, converted hydrocarbon and catalyst are withdrawn from said zone and separated, and catalyst containing $C_5$ and lighter hydrocarbon is recirculated to said zone, the improved method of refortifying said catalyst with fresh aluminum halide which comprises dispersing at least a portion of said catalyst being recirculated into normally liquid hydrocarbon having at least 6 carbon atoms per molecule, thereby removing $C_5$ and lighter hydrocarbon from said catalyst thus contacted, conveying thus stabilized catalyst to a mixing zone at about atmospheric pressure, adding aluminum halide to said catalyst, and returning the thus fortified catalyst to said reaction zone.

3. In an alkylation process wherein olefin and isoparaffin are contacted with liquid hydrocarbon-aluminum chloride catalyst in a reaction zone at a pressure of about 350 to 500 p.s.i.g., catalyst containing hydrocarbon having 2 to 5 carbon atoms per molecule is separated from a reaction effluent stream and recirculated to said reaction zone, the improved method of refortifying said catalyst with fresh aluminum chloride which comprises dispersing at least a portion of said catalyst being recirculated in a body of normally liquid paraffin hydrocarbon of at least 6 carbon atoms per molecule and in the gasoline boiling range, thereby replacing $C_5$ and lighter hydrocarbon in said catalyst with said liquid paraffin hydrocarbon, separating thus stabilized catalyst as a phase below said body of liquid paraffin hydrocarbon, passing said catalyst to a mixing zone at about atmospheric pressure, adding aluminum chloride to said catalyst, and returning said catalyst thus refortified to said reaction zone.

4. The method of claim 3 wherein said normally liquid paraffin hydrocarbon is alkylate formed in said alkylation process having at least 7 carbon atoms per molecule and an end point below 400° F.

5. An alkylation process wherein olefin and isoparaffin are contacted with liquid hydrocarbon-aluminum chloride catalyst in a reaction zone at a pressure of about 350 to 500 p.s.i.g., passing an effluent hydrocarbon stream containing said catalyst to a first settling zone, removing the effluent hydrocarbon stream from the upper region of said first settling zone and passing said hydrocarbon stream to a second settling zone, removing said hydrocarbon stream from the upper region of said second settling zone and passing said hydrocarbon stream through a caustic wash zone to a fractionation zone, removing propane and butane from the upper region of said fractionation zone, withdrawing hydrocarbon boiling above 400° F. from the bottom of said fractionation zone, removing a light alkylate stream and a heavy alkylate stream intermediate said upper region and bottom of said fractionation zone, withdrawing said catalyst containing hydrocarbon having 2 to 5 carbon atoms per molecule from the lower regions of said first and second settling zones, recirculating said catalyst to said reaction zone, dispersing at least a portion of said catalyst being recirculated in a body of normally liquid paraffin hydrocarbon in a stabilizing zone, said liquid paraffin hydrocarbon having at least 6 carbon atoms per molecule and in the gasoline boiling range, passing a $C_5$ and lighter hydrocarbon stream from the upper region of said stabilizing zone to said fractionation zone, separating a stabilized catalyst as a phase below said body of liquid paraffin hydrocarbon, passing said catalyst to a mixing zone at about atmospheric pressure, adding aluminum chloride to said catalyst, and returning said catalyst refortified to said reaction zone.

References Cited in the file of this patent
UNITED STATES PATENTS

| | | |
|---|---|---|
| 2,088,497 | Tijmstra | July 27, 1937 |
| 2,349,821 | Fragen | May 30, 1944 |
| 2,378,733 | Sensel | June 19, 1945 |
| 2,855,448 | Goard | Oct. 7, 1958 |